W. L. BLISS.
SYSTEM OF ELECTRICAL DISTRIBUTION.
APPLICATION FILED FEB. 26, 1917. RENEWED FEB. 9, 1922.
1,434,362.  Patented Nov. 7, 1922.
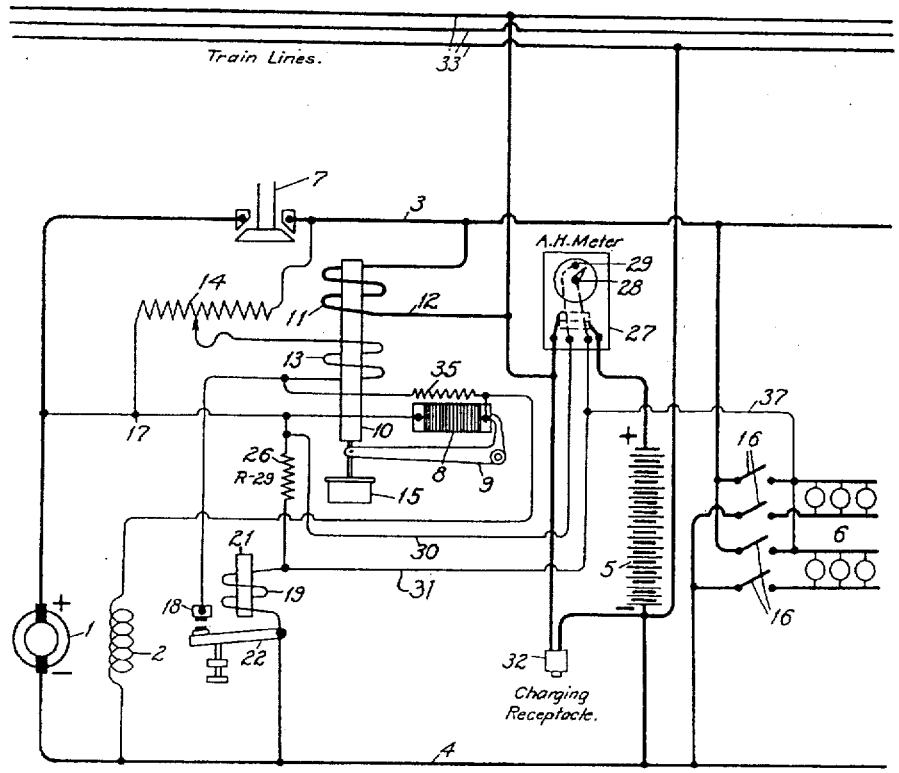
Witnesses
Inventor
William L. Bliss
By
Attorney Patented Nov. 7, 1922.

1,434,362

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

Application filed February 26, 1917. Serial No. 150,999. Renewed February 9, 1922. Serial No. 535,395.

*To all whom it may concern:*

Be it known that I, WILLIAM L. BLISS, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the invention relates to systems of electrical distribution involving variable speed generators such as are used in railway and automobile lighting systems wherein the generator is employed to charge a storage battery and supply a lamp or other load. When the generator is at rest or is operating at low speed, the battery supplies the load.

In charging the storage battery it is necessary to impress across its terminals a higher voltage than said battery will deliver upon discharge. Consequently, in many systems a regulator is provided between the storage battery and the lamp circuit to reduce the voltage when the generator is directly supplying current for said lamp circuit. In such systems the resistance of said regulator is reduced to its minimum when the battery is discharging to supply the lamp circuit. The present invention relates to a system wherein this regulator in the lamp circuit may be eliminated.

An object of the present invention is to provide a system in which it will not be necessary to use a lamp regulator, but in which there will be no undue fluctuations across the lamp circuit.

A further object is to provide a system involving a variable speed generator in which the voltage of the generator will be automatically reduced to a value proper for supplying the lamp circuit whenever the lamps are turned on.

Further objects will be apparent as the description proceeds.

Referring to the drawings:

The figure represents one embodiment of the present invention.

The figure represents an embodiment of the invention which is a modification of one of the systems disclosed in my co-pending application Serial No. 61,558, filed November 15, 1915, for systems of electrical distribution. It is to be understood, however, that the invention is not limited in its use to the system disclosed in said application. The figure illustrates a variable speed generator having an armature 1 and a shunt field winding 2. Positive and negative generator leads 3 and 4 supply a storage battery 5 and lamps or other translating devices 6, connected in parallel branches across the leads. An automatic switch 7, of any preferred construction, is arranged in one of the generator leads. The automatic switch will connect the generator to the system when the generator voltage substantially equals the battery voltage and will disconnect the generator when its voltage falls below that of the battery. Regulation of the generator is accomplished by means of the variable resistance, herein illustrated as a compressible rheostat 8, in series with the generator field. The rheostat is controlled by a bell crank lever 9, pivotally connected to a magnetic member or core 10, normally under the control of a coil 11, surrounding said core and connected in the battery lead 12. A second winding 13 is adapted, under certain conditions, to co-operate with the coil 11 in the control of the rheostat. Across the terminals of the automatic switch 7 is an adjustable resistance 14. One terminal of the coil 13 is connected to a point approximately in the center of the resistance 14. The other terminal of the coil 13 is connected through switch 22 to the negative lead 4. A dash pot 15 may be provided to steady the action of the core 10. Switches 16 are provided for throwing the lamp circuits 6 in and out of circuit.

The switch 22 is operated by a magnet 21, energized by a coil 19 which is connected across the generator between the binding post 17 and the negative lead 4, through the resistance 26, which is preferably of zero temperature coefficient. The resistance 26 is adapted to be short-circuited under predetermined conditions, which will be described hereinafter.

A meter 27 is connected in the battery circuit and may be of any desired type. It preferably consists of a compensating ampere hour meter which will register the ampere hours delivered to the battery and will automatically change its rate of registration on reversal of the direction of current flowing therethrough, whereby to compensate for battery losses, so as at all times to accurately indicate the state of charge of the battery. The indicating pointer 28 of the meter is adapted to make contact with the contact 29 when a predetermined number of ampere hours, indicating full charge of the battery, has been registered. The contact 29 is connected to one side of the resistance 26 through the conductor 30, whereas the pointer 28 is connected to the other side of said resistance 26 through the conductor 31. The pointer 28 and the contact 29 therefore, control a short circuit around resistance 26, which short circuit is closed when the meter indicates full charge, and open when less than a full charge is indicated.

A charging receptacle is shown at 32 and train lines at 33. These are connected around the ampere hour meter 27 and the battery 5; so that any current supplied to the battery by either the charging receptacle or the train lines will be registered by the ampere hour meter, and any current taken out of the battery by way of the train lines will likewise be registered on the ampere hour meter.

One side of each of the lamp circuits 6 is connected through conductor 37 to the conductor 31, which connects through the coil 19 to the generator lead 4. The same side of each of said lamp circuits 6 connects through a switch 16 with the generator lead 3 so that whenever a switch 16 is closed to turn on lamps, the circuit of relay coil 19 will be completed directly across the mains without the interposition of resistance 26. The shunt field winding 2 of the generator may be connected to the coil 13 through the resistance 35 for a purpose which will be referred to hereinafter.

A mode of operation of the system disclosed in Figure 1 will be substantially as follows: When the generator is at rest or rotating at a speed insufficient to develop the voltage necessary to close the automatic switch, said automatic switch will be open, as illustrated. If any of the lamp circuits are closed at this time, they will be supplied by the storage battery 5. The rheostat 8 will be under maximum pressure whereby the resistance of the field circuits is a minimum. A small amount of current will flow from the positive battery terminal, through the ampere hour meter 27, wire 12, part of the adjustable resistance 14, coil 13, resistance 35, field coil 2, to the negative terminal of the battery, thus producing the initial excitation for the generator. Current through coil 13 at this time will oppose the magnetic effect of the current in coil 11. No lifting effect will be exerted on plunger 10 when the battery is discharging to the lamps.

When the generator starts up and is operating at a sufficient speed, the automatic switch will close, and current will be delivered to the leads 3 and 4. If the ampere hour meter contacts 28 and 29 are open and none of the lamp circuits are closed, the generator will deliver a charging current to the storage battery. Inasmuch as the current to the battery must pass through coil 11, which is operatively associated with the rheostat 8, an excessive current will be prevented from entering the battery. In case the ampere hour meter contacts are closed, as when full charge to the battery is indicated, or in case one of the lamp circuits should be turned on, a short circuit will be completed around resistance 26 whereby the coil 19 will be subject to the voltage across the leads 3 and 4. The magnet 21 will raise the switch 22, whereby to close the circuit of the coil 13 across the leads. The resistance 14 will be so adjusted that the coil 13 will be operative to reduce the field excitation to the desired value, which will preferably be equal to the floating voltage of the storage battery. Thereafter, the generator will directly supply the lamp circuit until its speed is reduced to a point at which it is inoperative to develop the necessary voltage, at which time the automatic switch will open and the battery will supply the lamp load.

If desired the ampere hour meter may be dispensed with, if the expense of said meter is considered unwarranted. In that case, closure of any of the lamp circuits will render the coil 13 operative to reduce the generator voltage to the value desired.

It will be apparent that according to the present invention, the lamp regulator is dispensed with, with the elimination of the voltage drop which is usually attendant thereto, even when said lamp regulator is in its fully compressed condition. Though the lamp regulator is eliminated, the lamp circuit is not subject to great variations in voltage.

One embodiment of the present invention has been described in detail. Many modifications will occur to those skilled in the art. It is intended that this patent shall include all such modifications that fall within the scope of the invention as defined by the appended claims.

What I claim as new and desire to secure by Letters Patent of the United States is:—

1. In combination, a variable speed generator, a storage battery and a lamp circuit, means for measuring the state of charge of said battery, and means responsive both to said measuring means and to said lamp circuit for controlling the output of said generator.

2. In combination, a generator, a storage battery and a lamp circuit, an ampere hour meter for measuring the input and output of said battery, and means responsive both to said meter and to said lamp circuit for controlling the output of said generator.

3. In an electrical system of distribution, a variable speed generator, a storage battery to be charged thereby, a lamp circuit, means for regulating the voltage of the generator, means for measuring the net state of charge of the battery, means under the control of said charge measuring means for varying the standard of operation of the generator regulator, switches for controlling the lamp circuit, and connections whereby closure of one of said lamp switches will also vary the standard of operation of the generator regulator by causing operation of the means under control of the charge measuring means.

4. In combination, a variable speed generator, a storage battery to be charged thereby, a lamp circuit, a generator regulator, means for measuring the state of charge of the battery, means under control of said measuring means for causing the generator regulator to maintain a predetermined lower voltage on the generator when said battery is substantially charged, and means whereby closure of the lamp circuit will operate to reduce the generator voltage to said predetermined lower voltage, regardless of the state of charge of the battery.

In witness whereof, I have hereunto subscribed my name.

WILLIAM L. BLISS.